US012000187B2

(12) United States Patent
Taylor et al.

(10) Patent No.: US 12,000,187 B2
(45) Date of Patent: Jun. 4, 2024

(54) SECURITY DEVICE FOR SLIDING DOOR OR SLIDING WINDOW ASSEMBLY

(71) Applicants: Joseph Curtis Taylor, Birch Run, MI (US); Jack Roy Taylor, Clio, MI (US); Jack Michal Taylor, Clio, MI (US)

(72) Inventors: Joseph Curtis Taylor, Birch Run, MI (US); Jack Roy Taylor, Clio, MI (US); Jack Michal Taylor, Clio, MI (US)

( * ) Notice: Subject to any disclaimer, the term of this patent is extended or adjusted under 35 U.S.C. 154(b) by 0 days.

(21) Appl. No.: 18/180,547

(22) Filed: Mar. 8, 2023

(65) Prior Publication Data

US 2023/0220710 A1 Jul. 13, 2023

Related U.S. Application Data

(63) Continuation of application No. 17/197,810, filed on Mar. 10, 2021, now Pat. No. 11,624,220.

(Continued)

(51) Int. Cl.
*E05C 19/18* (2006.01)

(52) U.S. Cl.
CPC .......... *E05C 19/184* (2013.01); *E05C 19/188* (2013.01)

(58) Field of Classification Search
CPC ........ E05C 17/00; E05C 17/44; E05C 17/443; E05C 17/54; E05C 19/18; E05C 19/184;
(Continued)

(56) References Cited

U.S. PATENT DOCUMENTS 51,803 A * 1/1866 Childs ................. E05B 65/0864 292/145
1,544,268 A 6/1925 Murray
(Continued)

FOREIGN PATENT DOCUMENTS

AU 2011256239 B2 1/2015
CN 203905678 U 10/2014
(Continued)

OTHER PUBLICATIONS

Fire Door Solutions LLC, "DoorArmor by Fire Door Solutions: Protecting Schools From Active Shooters." Retrieved from https://firedoorarmor.com/downloads/fire-door-armor.pdf.
Taylor Brothers Door Lock, LLC, "Nightlock® Lockdown 1." Retrieved from https://nightlock.com/door-security-devices/door-barricade/nightlock-lockdown/.
Office Action regarding U.S. Appl. No. 13/363,106, dated Nov. 20, 2013.
Office Action regarding U.S. Appl. No. 13/363,106, dated Mar. 13, 2014.
(Continued)

*Primary Examiner* — Christine M Mills
*Assistant Examiner* — Yahya Sidky
(74) *Attorney, Agent, or Firm* — Harness, Dickey & Pierce, P.L.C.

(57) ABSTRACT

A security device can be provided to selectively restrict or prevent the opening of a sliding door, sliding window, or other sliding panel or other closure. For example, the security device can include a base plate that selectively engages a barricade member (or lock rail). While the barricade member is engaged with the base plate (in a locked state), the barricade member and base plate cooperate to restrict or prevent the sliding door, window, panel or other closure from moving to an open position (or moving out of a closed position). The barricade member can be moved relative to the base plate (to an unlocked state) to allow unrestricted movement of the sliding door, window, panel or other closure. The security device can include stop members that may restrict or prevent complete removal of the barricade member from the base plate.

19 Claims, 3 Drawing Sheets

Related U.S. Application Data

(60) Provisional application No. 62/991,867, filed on Mar. 19, 2020.

(58) Field of Classification Search
CPC .... E05C 19/188; Y10S 292/15; Y10T 292/34; Y10T 292/65; Y10T 292/67
USPC .............................................................. 16/82
See application file for complete search history.

(56) References Cited

U.S. PATENT DOCUMENTS

| | | | |
|---|---|---|---|
| 1,571,543 | A | 2/1926 | Fratzke |
| 2,205,614 | A | 6/1940 | Bashe |
| 2,264,962 | A | 12/1941 | Adams |
| 3,378,293 | A | 4/1968 | Silk |
| 3,661,413 | A | 5/1972 | Silva |
| 3,768,847 | A | 10/1973 | Buck, Jr. et al. |
| 3,833,963 | A | 9/1974 | Waters |
| 3,973,420 | A | 8/1976 | Brady et al. |
| 4,017,105 | A | 4/1977 | Paxton |
| 4,139,249 | A | 2/1979 | Hillman |
| 4,163,574 | A | 8/1979 | Chezem |
| 4,208,841 | A | 6/1980 | Starks |
| 4,270,668 | A | 6/1981 | Berfield |
| 4,274,666 | A | 6/1981 | Peck |
| 4,303,265 | A | 12/1981 | Beard |
| 4,579,377 | A | 4/1986 | Dallaire et al. |
| 4,714,284 | A | 12/1987 | Varlet |
| 4,759,575 | A | 7/1988 | McKnight |
| 4,792,168 | A | 12/1988 | Kardosh |
| 4,822,084 | A | 4/1989 | Fox |
| 4,907,832 | A | 3/1990 | Pemberton |
| 4,932,694 | A | 6/1990 | Cater, Sr. |
| 4,955,648 | A | 9/1990 | Miller |
| 5,040,835 | A | 8/1991 | Barker |
| 5,199,759 | A | 4/1993 | Anderson |
| 5,203,596 | A | 4/1993 | Stevens |
| 5,209,018 | A | 5/1993 | Heinrich |
| 5,226,201 | A | 7/1993 | Lefebvre |
| 5,292,013 | A | 3/1994 | Earl |
| 5,383,254 | A | 1/1995 | Wigley, Sr. |
| 5,445,451 | A | 8/1995 | Harmony |
| 5,454,143 | A | 10/1995 | Wigley, Sr. |
| 5,454,610 | A | 10/1995 | Taylor et al. |
| 5,531,490 | A | 7/1996 | Parker |
| 5,549,338 | A | 8/1996 | Wingfield et al. |
| 5,590,918 | A | 1/1997 | Kambalov |
| 5,590,928 | A | 1/1997 | Voiculescu |
| 5,601,320 | A | 2/1997 | Miller |
| 5,645,304 | A | 7/1997 | Richardson et al. |
| D384,875 | S | 10/1997 | Sayler et al. |
| 5,771,533 | A | 6/1998 | Kuang-Pin |
| 5,865,484 | A | 2/1999 | Johns |
| 5,904,325 | A | 5/1999 | Hung |
| D419,052 | S | 1/2000 | Laporte et al. |
| 6,082,431 | A | 7/2000 | Decola |
| 6,167,655 | B1 | 1/2001 | Santa Cruz et al. |
| 6,340,185 | B1 | 1/2002 | Truong |
| 6,352,290 | B1 | 3/2002 | Scottino |
| 6,382,689 | B1 | 5/2002 | Brown |
| 6,397,645 | B1 | 6/2002 | Grant, Jr. |
| 6,471,264 | B1 | 10/2002 | Ryan |
| 6,484,445 | B2 | 11/2002 | Chang |
| 6,550,828 | B2 | 4/2003 | Warden |
| 6,655,720 | B2 | 12/2003 | Rampen |
| 6,666,486 | B1 | 12/2003 | Fleming |
| 6,832,251 | B1 | 12/2004 | Gelvin et al. |
| 7,005,984 | B2 | 2/2006 | Maloney |
| 7,651,140 | B2 | 1/2010 | Leggio |
| D612,717 | S | 3/2010 | Frankel |
| 7,731,252 | B1 | 6/2010 | Stewart |
| 7,961,088 | B2 | 6/2011 | Watts et al. |
| 8,096,593 | B2 | 1/2012 | Gibbons |
| 8,510,994 | B2 | 8/2013 | Scott |
| 8,754,769 | B2 | 6/2014 | Stein et al. |
| 8,888,146 | B2 | 11/2014 | Taylor et al. |
| 8,894,110 | B2 | 11/2014 | Taylor et al. |
| 8,963,713 | B2 | 2/2015 | Dawes et al. |
| D728,264 | S | 5/2015 | Bacolas |
| 9,482,034 | B2 | 11/2016 | Atkinson, Jr. |
| 9,534,430 | B2 | 1/2017 | Taylor et al. |
| 9,704,000 | B2 | 7/2017 | Pleshek et al. |
| 9,957,741 | B2 | 5/2018 | Taylor et al. |
| D860,682 | S | 9/2019 | Gaetano |
| 10,592,861 | B2 | 3/2020 | Kemp |
| 10,689,890 | B2 | 6/2020 | Taylor et al. |
| 11,624,220 | B2 * | 4/2023 | Taylor ................. E05B 65/0894 292/288 |
| 2002/0067046 | A1 | 6/2002 | Cox |
| 2007/0090921 | A1 | 4/2007 | Fisher |
| 2009/0127870 | A1 | 5/2009 | Leggio |
| 2009/0153291 | A1 | 6/2009 | Larson et al. |
| 2011/0011137 | A1 | 1/2011 | Frankel |
| 2011/0291426 | A1 | 12/2011 | Gibson |
| 2013/0193695 | A1 * | 8/2013 | Taylor ..................... E05C 17/54 292/137 |
| 2014/0217754 | A1 | 8/2014 | Taylor et al. |
| 2014/0352899 | A1 | 12/2014 | Moolenbeek |
| 2015/0048631 | A1 | 2/2015 | Ploskunak |
| 2015/0076844 | A1 | 3/2015 | Taylor et al. |
| 2016/0010372 | A1 | 1/2016 | Taylor et al. |
| 2017/0145721 | A1 | 5/2017 | Taylor et al. |
| 2017/0228954 | A1 | 8/2017 | Evans et al. |
| 2019/0003221 | A1 | 1/2019 | Taylor et al. |
| 2020/0318405 | A1 | 10/2020 | Taylor et al. |
| 2021/0025205 | A1 | 1/2021 | Taylor et al. |

FOREIGN PATENT DOCUMENTS

| | | | |
|---|---|---|---|
| DE | 1036482 | B | 8/1958 |
| DE | 202016001589 | U1 | 6/2016 |
| WO | WO-2006015239 | A2 | 2/2006 |

OTHER PUBLICATIONS

Office Action regarding U.S. Appl. No. 14/172,485, dated Mar. 25, 2014.

Office Action regarding U.S. Appl. No. 14/551,829, dated Jan. 16, 2015.

Office Action regarding U.S. Appl. No. 14/800,189, dated Mar. 29, 2016.

Office Action regarding U.S. Appl. No. 15/394,099, dated Jun. 6, 2017.

Office Action regarding U.S. Appl. No. 15/394,099, dated Oct. 17, 2017.

International Search Report regarding International Application No. PCT/US2018/040248, dated Nov. 16, 2018.

Written Opinion of the International Searching Authority regarding International Application No. PCT/US2018/040248, dated Nov. 16, 2018.

Office Action regarding U.S. Appl. No. 15/668,133, dated Sep. 10, 2019.

Office Action regarding Chinese Patent Application No. 201880043598.9, dated Oct. 27, 2020. Translation provided by Unitalen Attorneys at Law.

Office Action regarding Canadian Patent Application No. 3,068,307, dated Feb. 9, 2021.

Search Report regarding European Patent Application No. 18823348.0, dated Mar. 5, 2021.

Office Action regarding U.S. Appl. No. 16/935,944, dated Jan. 18, 2022.

Office Action regarding U.S. Appl. No. 16/906,366, dated Dec. 27, 2021.

Notice of Allowance regarding U.S. Appl. No. 16/906,366 dated Jun. 17, 2022.

Final Office Action regarding U.S. Appl. No. 17/197,810 dated Aug. 23, 2022.

(56) References Cited

OTHER PUBLICATIONS

Notice of Allowance regarding U.S. Appl. No. 17/197,810 dated Dec. 9, 2022.

* cited by examiner

SECURITY DEVICE FOR SLIDING DOOR OR SLIDING WINDOW ASSEMBLY

CROSS-REFERENCE TO RELATED APPLICATIONS

This application is a continuation of U.S. patent application Ser. No. 17/197,810 filed on Mar. 10, 2021, which claims the benefit of U.S. Provisional Application No. 62/991,867, filed on Mar. 19, 2020. The entire disclosures of the above applications are incorporated herein by reference.

FIELD

The present disclosure relates to a security device for a sliding door or a sliding window assembly.

BACKGROUND AND SUMMARY

This section provides background information related to the present disclosure and is not necessarily prior art. This section also provides a general summary of the disclosure, and is not a comprehensive disclosure of its full scope or all of its features.

A security device can be provided to selectively restrict or prevent the opening of a sliding door, sliding window, or other sliding panel or other closure. For example, the security device can include a base plate that selectively engages a barricade member (or lock rail). While the barricade member is engaged with the base plate (in a locked state), the barricade member and base plate cooperate to restrict or prevent the sliding door, window, panel or other closure from moving to an open position (or moving out of a closed position). The barricade member can be moved relative to the base plate (to an unlocked state) to allow unrestricted movement of the sliding door, window, panel or other closure. The security device can include stop members that may restrict or prevent complete removal of the barricade member from the base plate.

In some configurations of the security device of the above paragraph, a portion of the barricade member includes a T-shaped cross section that is movably received in the slot of the base plate. The slot has a T-shaped cross section that corresponds to the T-shaped cross section of the portion of the barricade member.

In some configurations of the security device of either of the above paragraphs, the base plate includes a plurality of openings that receive fasteners. The fasteners are configured to fixedly secure the base plate to a mounting surface. The mounting surface could be a floor surface or a window sill, for example.

In some configurations of the security device of any of the above paragraphs, the first and second stop members are positioned relative to each other such that the first and second stop members interfere with each other to restrict or prevent the barricade member from being fully removed from the slot in the base plate while still allowing the barricade member to be moved relative to the base plate to a position whereby the barricade member does not block the path of movement of the sliding panel.

In some configurations of the security device of any of the above paragraphs, the first stop member is attached to an intermediate portion of the barricade member at or proximate to a front edge of the intermediate portion.

In some configurations of the security device of any of the above paragraphs, the second stop member is attached to a top surface of the base plate at or proximate to a rear edge of the base plate.

In some configurations of the security device of any of the above paragraphs, the first stop member extends from the barricade member in a direction parallel to a path of movement of the sliding panel.

In some configurations of the security device of any of the above paragraphs, the second stop member extends from the base plate in a direction perpendicular to the path of movement of the sliding panel.

In some configurations of the security device of any of the above paragraphs, one of the first and second stop members is movable between a deployed position and a retracted position. In the deployed position, the second stop member interferes with the first stop member to limit the range of motion of the barricade member relative to the base plate. In the retracted position, the second stop member does not interfere with the first stop member such that the barricade member can be fully disengaged from the base plate.

In some configurations, the security device of any of the above paragraphs may include a spring biasing the one of the first and second stop members toward the deployed position.

In some configurations of the security device of any of the above paragraphs, the second stop member is movable within an aperture in the base plate between the deployed position and the retracted position.

In some configurations of the security device of any of the above paragraphs, the spring is disposed within the aperture and is compressible to allow the second stop member to be depressed into the retracted position. The spring biases the second stop member toward the deployed position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
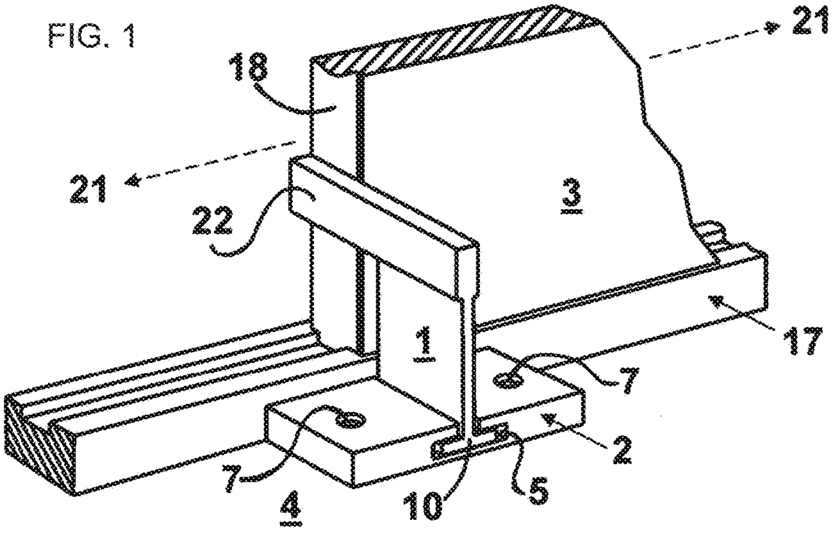
FIG. 1 is a perspective view of a security device and sliding panel.
Figure 2:
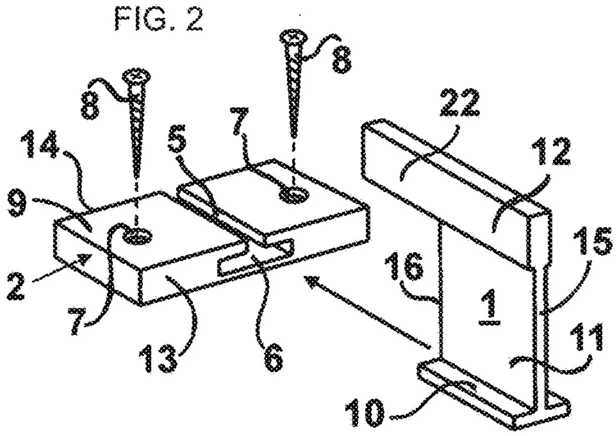
FIG. 2 is an exploded perspective view of the security device.
Figure 3:
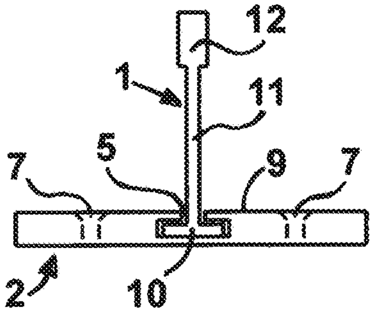
FIG. 3 is a front view of the security device.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a security device for a sliding panel 3 (e.g., a sliding door, sliding window, or other sliding closure) is provided. The sliding panel 3 is slidably mounted on a frame track 17 of a sliding door or window assembly. As will be subsequently described, a user can selectively switch the security device between an unlocked state in which the security device allows the sliding panel 3 to slide along the length of the frame track 17 between open and closed positions and a locked state in which the security device restricts or prevents the sliding panel 3 from moving away from the closed position (i.e., to restrict or prevent unwanted or unauthorized opening of the sliding panel 3).

As shown in FIGS. 1-5, the security device may include a removable barricade member (or lock rail) 1 and a base plate 2. The base plate 2 may be a generally flat anchor plate, having a plurality of openings 7 for receiving fasteners (e.g., screws) 8, which can securely fasten the base plate 2 to a mounting surface 4 (e.g., a floor or window sill). The base plate 2 may include a slot 5 (e.g., a generally T-shaped slot) that slidably engages the barricade member 1.

The barricade member 1 may include a base portion 10, an intermediate portion 11, and an upper portion 12. The intermediate portion 11 extends upward from the base portion 10 and may cooperate with the base portion 10 to form a generally T-shaped cross section. In this manner, the base portion 10 and a lower end of the intermediate portion 11 can be slidably received in the slot 5. The slot 5 is open at a top surface 9 of the base plate 2 (so that the intermediate portion 11 can extend out of the slot 5). The slot 5 is also open at a rear edge 13 of the base plate 2 (to allow the barricade member 1 to be inserted into the slot 5). The slot 5 is optionally open at a front edge 14 of the base plate 2 as well.

The upper portion 12 extends from an upper end of the intermediate portion 11 and may extend from a front edge 16 of the intermediate portion 11 in a cantilevered fashion. That is, a cantilevered portion 22 of the upper portion 12 extends away from the front edge 16 and a rear edge 15 of the intermediate portion 11.

Figure 4:
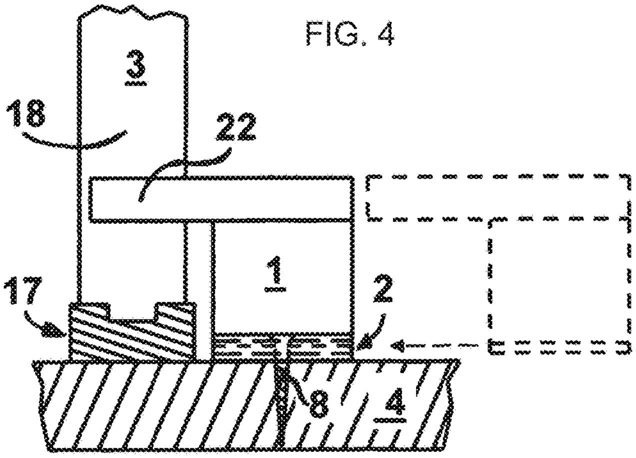
FIG. 4 is a side view of the security device in a locked state (shown in solid lines) and in an unlocked state (shown in phantom lines)
Figure 5:
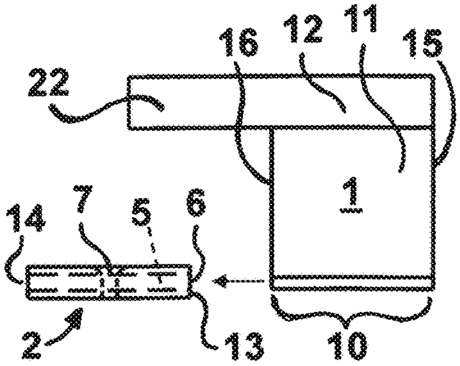
FIG. 5 is a side view of the security device in the unlocked state.
Figure 7:
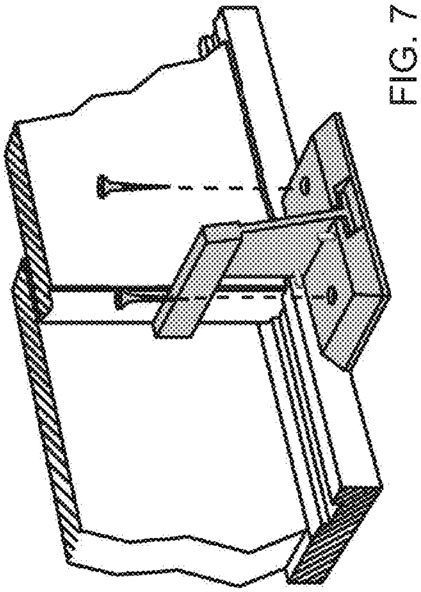
FIG. 7 is a partially exploded view of the security device of FIG. 6.

The barricade member 1 is slidable within the slot 5 in the base plate 2 between the locked state (shown in FIG. 1 and in FIG. 4 is solid lines) and the unlocked state (shown in FIG. 5 and in FIG. 4 in phantom lines). As shown in FIGS. 1 and 4, in the locked state, the cantilevered portion 22 of the barricade member 1 may be in contact with or in close proximity to a leading edge 18 of the sliding panel such that the cantilevered portion 22 blocks a path of movement 21 of the sliding panel 3 relative to the frame track 17 to restrict or prevent the sliding panel 3 from moving away from the closed position. To switch the security device to the unlocked state, a user can slide the barricade member 1 along the length of the slot 5 away from the sliding panel 3 (in a direction generally perpendicular to the path of movement 21 of the sliding panel 3) until the cantilevered portion 22 is no longer blocking the path of movement 21 of the sliding panel 3.

Referring now to FIGS. 6-9, another embodiment of the security device is provided. The security device of FIGS. 6-9 may be similar or identical to the security device shown in FIGS. 1-5, except that the security device of FIGS. 6-9 includes a first stop member 30 and a second stop member 32 that cooperate to restrict or prevent the barricade member 1 from being fully removed from the base plate 2.

The first and second stop members 30, 32 can be pins or other protrusions, for example. The first stop member 30 may be attached to the barricade member 1, and the second stop member 32 may be attached to the base plate 2. For example, the first stop member 30 may be attached to the intermediate portion 11 of the barricade member 1 at or proximate to the front edge 16 of the intermediate portion 11. The first stop member 30 may extend from the barricade member 1 in a direction generally parallel to the path of movement 21 (FIG. 1) of the sliding panel 3. The second stop member 32 may be attached to the top surface 9 of the base plate 2 at or proximate to the rear edge 13 of the base plate 2. The first and second stop members 30, 32 can be attached to the barricade member 1 and base plate 2, respectively, by any suitable means, such as by press fitting, threaded engagement, welding, etc. In some configurations, the stop members 30, 32 can be integrally formed with the barricade member 1 and base plate 2, respectively.

Figure 9:
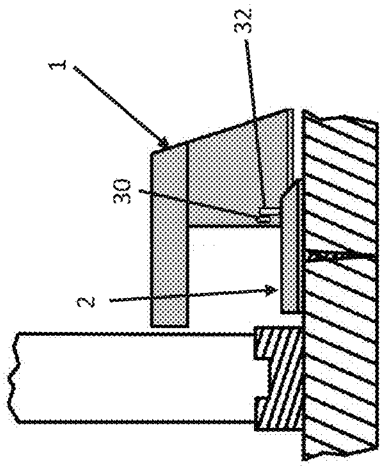
FIG. 9 is a side view of the security device of FIG. 6 in an unlocked state.
Figure 6:
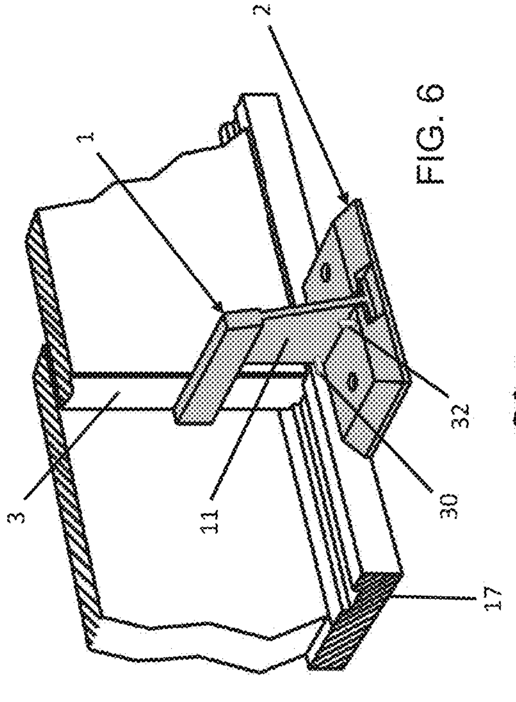
FIG. 6 is a perspective view of another embodiment of the security device.
Figure 8:
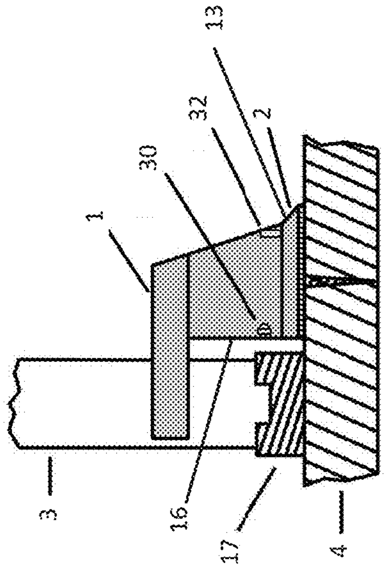
FIG. 8 is a side view of the security device of FIG. 6 in a locked state.

The first and second stop members 30, 32 are positioned relative to each other such that the first and second stop members 30, 32 interfere with each other to restrict or prevent the barricade member 1 from being fully removed from the slot 5 in the base plate 2 while still allowing the barricade member 1 to be moved relative to the base plate 2 to a position whereby the barricade member 1 does not block the path of movement of the sliding panel 3, as shown in FIG. 9. In this manner, the stop members 30, 32 allow the security device to be switched to the unlock state, while restricting or preventing the barricade member 1 from being completely disengaged from the base plate 2. This allows the security device to be fully functional in the unlocked and locked states while preventing the barricade member 1 from being removed from the base plate 2 and potentially getting lost or stolen.

In some configurations, the stop members 30, 32 are fixed relative to the barricade member 1 and base plate 2, respectively. In other configurations, one or both of the stop members 30, 32 may be movable relative to the barricade member 1 and base plate 2, respectively, to allow for full removal of the barricade member 1 if the user actively moves (or removes) one of the stop members 30, 32 so that the stop members 30, 32 no longer restrict the movement of the barricade member 1 relative to the base plate 2. For example, one or both of the stop members 30, 32 may be spring loaded within respective apertures in the barricade member 1 or base plate 2 to allow the stop member 30, 32 to be depressed into the aperture to allow the first stop member 30 to clear the second stop member 32 as the barricade member 1 is fully removed from the base plate 2.

Figure 10:
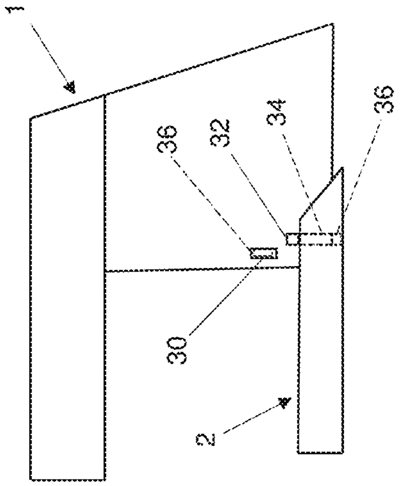
FIG. 10 is a side view of the security device with a stop member in a retracted position.

FIG. 10 shows an example configuration in which the stop member 32 is depressed into an aperture 34 in the base plate 2. A spring 36 (e.g., a coil spring or any other compressible member) may be disposed within the aperture 34 and is compressible to allow the stop member 32 to be depressed into a retracted position in which the stop member 32 does not interfere with the stop member 30 (i.e., to allow the barricade 1 to be removed from the base plate 2). The spring 36 biases the stop member 32 upward toward a deployed position (FIG. 9) in which the stop member 32 can interfere with the stop member 30 to restrict the movement of the barricade member 1 relative to the base plate 2.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A security device operable to selectively restrict movement of a sliding panel, the security device comprising:

a barricade member including a first stop member; and a base plate having a slot that movably receives a portion of the barricade member, the base plate having a second stop member that interferes with the first stop member to limit a range of motion of the barricade member relative to the base plate, wherein the barricade member includes a base portion, an intermediate portion, and an upper portion, wherein the first stop member is attached to the intermediate portion of the barricade member at or proximate to a front edge of the intermediate portion of the barricade member and protrudes from the barricade member, wherein the second stop member is attached to a top surface of the base plate at or proximate to a rear edge of the base plate and protrudes from the base plate, and wherein when the portion of the barricade is received in the slot of the base plate, the rear edge is spaced farther apart from a path of movement of the sliding panel than the front edge is spaced apart from the path of movement of the sliding panel.

2. The security device of claim 1, wherein the first and second stop members limit the range of motion of the barricade member in a first direction that is perpendicular to a path of movement of the sliding panel.

3. The security device of claim 2, wherein the first stop member protrudes from the barricade member in a second direction parallel to the path of movement of the sliding panel.

4. The security device of claim 3, wherein the second stop member protrudes from the base plate in a third direction perpendicular to the path of movement of the sliding panel.

5. The security device of claim 1, wherein the portion of the barricade member includes a T-shaped cross section that is movably received in the slot of the base plate, and wherein the slot has a T-shaped cross section.

6. The security device of claim 5, wherein the base plate includes a plurality of openings that receive fasteners, wherein the fasteners are configured to fixedly secure the base plate to a mounting surface.

7. The security device of claim 6, wherein the mounting surface includes one of a floor surface and a window sill.

8. The security device of claim 1, wherein the first and second stop members are positioned relative to each other such that the first and second stop members interfere with each other to restrict or prevent the barricade member from being fully removed from the slot in the base plate while still allowing the barricade member to be moved relative to the base plate to a position whereby the barricade member does not block a path of movement of the sliding panel.

9. The security device of claim 8, wherein the first stop member extends from the barricade member in a direction parallel to a path of movement of the sliding panel.

10. The security device of claim 9, wherein the second stop member extends from the base plate in a direction perpendicular to the path of movement of the sliding panel.

11. The security device of claim 10, wherein one of the first and second stop members is movable between a deployed position and a retracted position, wherein in the deployed position, the second stop member interferes with the first stop member to limit the range of motion of the barricade member relative to the base plate, and wherein in the retracted position, the second stop member does not interfere with the first stop member such that the barricade member can be fully disengaged from the base plate.

12. The security device of claim 11, further comprising a spring biasing the one of the first and second stop members toward the deployed position.

13. The security device of claim 12, wherein the second stop member is movable within an aperture in the base plate between the deployed position and the retracted position.

14. The security device of claim 13, wherein the spring is disposed within the aperture and is compressible to allow the second stop member to be depressed into the retracted position, and wherein the spring biases the second stop member toward the deployed position.

15. A security device operable to selectively restrict movement of a sliding panel, the security device comprising:

a barricade member including a first stop member; and a base plate having a second stop member, wherein the barricade member is configured to movably engage the base plate between a first position that restricts movement of the sliding panel and a second position that does not restrict movement of the sliding panel, wherein when the barricade member is engaged with the base plate, the second stop member interferes with the first stop member to limit a range of motion of the barricade member relative to the base plate, the base plate includes a plurality of openings that receive fasteners, wherein the fasteners are configured to fixedly secure the base plate to a mounting surface, wherein the barricade member includes a base portion, an intermediate portion, and an upper portion, wherein the first stop member is attached to the intermediate portion of the barricade member at or proximate to a front edge of the intermediate portion of the barricade member and protrudes from the barricade member, wherein the second stop member is attached to a top surface of the base plate at or proximate to a rear edge of the base plate and protrudes from the base plate, and wherein when the barricade is engaged with the base plate, the rear edge is spaced farther apart from a path of movement of the sliding panel than the front edge is spaced apart from the path of movement of the sliding panel.

16. The security device of claim 15, wherein the first and second stop members are positioned relative to each other such that the first and second stop members interfere with each other to restrict or prevent the barricade member from being fully removed from the slot in the base plate while still allowing the barricade member to be moved relative to the base plate to the second position whereby the barricade member does not block a path of movement of the sliding panel.

17. The security device of claim 16, wherein the first stop member extends from the barricade member in a direction parallel to a path of movement of the sliding panel, and wherein the second stop member extends from the base plate in a direction perpendicular to the path of movement of the sliding panel.

18. The security device of claim 16, wherein one of the first and second stop members is movable between a deployed position and a retracted position, wherein in the deployed position, the second stop member interferes with the first stop member to limit the range of motion of the barricade member relative to the base plate, and wherein in the retracted position, the second stop member does not interfere with the first stop member such that the barricade member can be fully disengaged from the base plate.

19. The security device of claim 18, further comprising a spring biasing the one of the first and second stop members toward the deployed position, wherein the second stop member is movable within an aperture in the base plate between the deployed position and the retracted position, wherein the spring is disposed within the aperture and is compressible to allow the second stop member to be depressed into the retracted position, and wherein the spring biases the second stop member toward the deployed position.

* * * * *